(12) United States Patent
Kurita et al.

(10) Patent No.: US 7,558,022 B2
(45) Date of Patent: Jul. 7, 2009

(54) MAGNETIC DISK APPARATUS WITH HEATING DEVICE AND MAGNETIC HEAD SLIDER USED THEREFOR

(75) Inventors: Masayuki Kurita, Ibaraki (JP); Toshiya Shiramatsu, Ibaraki (JP); Hidekazu Kohira, Kanagawa (JP); Mikio Tokuyama, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 552 days.

(21) Appl. No.: 11/090,361

(22) Filed: Mar. 24, 2005

(65) Prior Publication Data

US 2005/0213250 A1    Sep. 29, 2005

(51) Int. Cl.
G11B 5/60 (2006.01)
G11B 21/21 (2006.01)

(52) U.S. Cl. .............................. 360/234.4; 360/125.31; 360/125.74; 360/294.7

(58) Field of Classification Search ............ 360/125.31, 360/125.74, 294.7, 234.4
See application file for complete search history.

(56) References Cited

U.S. PATENT DOCUMENTS

| | | | | |
|---|---|---|---|---|
| 6,690,543 B2* | 2/2004 | Kurita et al. | ............. | 360/234.7 |
| 7,064,930 B2* | 6/2006 | Serpe et al. | ............. | 360/236.5 |
| 7,110,219 B2* | 9/2006 | Ota | ............. | 360/128 |
| 7,113,369 B2* | 9/2006 | Ota et al. | ............. | 360/234.5 |
| 7,274,538 B2* | 9/2007 | Thurn et al. | ............. | 360/294.7 |
| 7,292,401 B2* | 11/2007 | Shen et al. | ............. | 360/69 |
| 2002/0024774 A1* | 2/2002 | Berger et al. | ............. | 360/294.7 |
| 2002/0145829 A1* | 10/2002 | Gates et al. | ............. | 360/235.7 |
| 2002/0191326 A1* | 12/2002 | Xu et al. | ............. | 360/75 |
| 2003/0174430 A1* | 9/2003 | Takahashi et al. | ............. | 360/75 |
| 2004/0130820 A1* | 7/2004 | Ota | ............. | 360/128 |
| 2005/0041340 A1* | 2/2005 | Sasaki et al. | ............. | 360/324 |
| 2005/0088784 A1* | 4/2005 | Macken et al. | ............. | 360/294.3 |
| 2005/0094316 A1* | 5/2005 | Shiramatsu et al. | ............. | 360/234.5 |
| 2006/0056094 A1* | 3/2006 | Fu et al. | ............. | 360/75 |
| 2006/0061237 A1* | 3/2006 | Ikeda et al. | ............. | 310/331 |
| 2006/0092570 A1* | 5/2006 | Payne et al. | ............. | 360/236.5 |
| 2006/0198056 A1* | 9/2006 | Maruyama et al. | ............. | 360/235.1 |
| 2007/0103814 A1* | 5/2007 | Yamanaka et al. | ............. | 360/128 |

FOREIGN PATENT DOCUMENTS

| JP | 05-020635 A | 1/1993 |
|---|---|---|
| JP | 2003-297029 A | 10/2003 |

* cited by examiner

Primary Examiner—Brian E Miller
(74) Attorney, Agent, or Firm—Townsend and Townsend and Crew LLP; Darren Gold

(57) ABSTRACT

Embodiments of the invention achieve a decrease in electric power consumption while ensuring high recording density and high reliability in a magnetic disk apparatus. In one embodiment, a magnetic disk apparatus comprises a rotatable magnetic disk and a magnetic head slider to be able to fly above a surface of the magnetic disk. The magnetic head slider comprises an air bearing surface, by which the magnetic head slider is caused to fly and come near to the rotating surface of the magnetic disk with a predetermined spacing therebetween, recording and reproducing elements to perform at least one of recording on and reproduction from the magnetic disk, and a heating device to adjust a distance between the recording and reproducing elements and the surface of the magnetic disk. The heating device is mounted such that heating thereof causes a part of the air bearing surface to expand and project to increase a distance between the recording and reproducing elements and the surface of the magnetic disk.

11 Claims, 11 Drawing Sheets

(a)

(b)

MAGNETIC DISK APPARATUS WITH HEATING DEVICE AND MAGNETIC HEAD SLIDER USED THEREFOR

CROSS-REFERENCES TO RELATED APPLICATIONS

This application claims priority from Japanese Patent Application No. JP2004-086020, filed Mar. 24, 2004, the entire disclosure of which is incorporated herein by reference.

BACKGROUND OF THE INVENTION

The present invention relates to a magnetic disk apparatus, and is specifically suited to a magnetic disk apparatus provided with a flying-amount adjustment slider having the function of adjusting a distance between a magnetic disk and a magnetic head.

Magnetic disk apparatuses comprise a rotating magnetic disk and a magnetic head slider mounting thereon a recording and reproducing element and supported and positioned radially by a load beam, the magnetic head slider running relatively on the magnetic disk to read and write magnetic information recorded on the magnetic disk. The magnetic head slider flies as an air lubricated bearing due to the wedge film effect of air, so that the magnetic disk and the magnetic head slider do not come into direct solid contact with each other. In order to realize making a magnetic disk apparatus high in recording density and to thereby realize making the apparatus large in capacity, or small in size, it is effective to decrease a distance between a magnetic head slider and a magnetic disk, that is, a slider flying amount to increase a track recording density.

Conventionally, in designing a slider flying amount, an individual difference in flying amount due to dispersion in working and assembly, a difference in flying amount due to ambient, atmospheric pressure in use, a difference in flying amount due to ambient temperature in use, a difference in flying amount due to recording/reproducing, and a difference in flying amount due to a radial position (peripheral speed) are beforehand estimated at the time of designing, and a margin in flying amount is provided so as to eliminate contact between a magnetic head slider and a magnetic disk even under most severe conditions. As such, reliability in magnetic disk apparatuses is ensured. Here, when it is possible to realize a magnetic disk apparatus provided with a magnetic head slider having the function of adjusting a flying amount every individual head, or according to an environment in use, it is possible to reduce the margin to decrease a recording and reproducing element in flying amount while preventing contact between a magnetic head slider and a magnetic disk.

JP-A-5-20635 (Patent Document 1) shows a conventional magnetic disk apparatus provided with a magnetic head slider having the function of adjusting a flying amount. With the magnetic disk apparatus in Patent Document 1, a heating device composed of a thin film resistor is provided in the neighborhood of a recording and reproducing element to heat a part of the magnetic head slider at need to cause thermal expansion thereof, thereby causing the recording and reproducing element portion to project to adjust a flying amount of the recording and reproducing element.

Also, JP-A-2003-297029 (Patent Document 2) shows a conventional magnetic disk apparatus provided with a magnetic head slider having the function of adjusting a flying amount. With the magnetic disk apparatus in Patent Document 2, a temperature sensor, a heating element, and a Peltier element are provided in the neighborhood of a recording and reproducing element, and the recording and reproducing element is maintained constant in temperature by a control circuit to enable maintaining a flying amount of the recording and reproducing element constant.

BRIEF SUMMARY OF THE INVENTION

The magnetic disk apparatus in Patent Document 1 is of a type, in which a recording and reproducing element portion of the magnetic head slider is caused by thermal expansion to project; in other words, only one-way control is exercised to supply electric current to the heating device to decrease a flying amount of the recording and reproducing element. Accordingly, with the magnetic disk apparatus in Patent Document 1, in order to eliminate contact between a magnetic head slider and a magnetic disk even under most severe conditions, which take account of a whole decrease in flying, such as an individual difference in flying amount due to dispersion in working and assembly, a difference in flying amount due to ambient, atmospheric pressure in use, a difference in flying amount due to ambient temperature in use, a difference in flying amount due to recording/reproducing, and a difference in flying amount due to a radial position (peripheral speed), to ensure reliability, there is a need of sharply increasing a central value in a flying-amount frequency distribution relative to a flying amount at the start of contact. Further, in order to achieve making the magnetic disk apparatus high recording density, it is necessary to decrease a flying amount of the recording and reproducing element as far as possible, so that there is a need of increasing an average value of flying adjustment strokes. In keeping with this, there is caused a problem that a large quantity of electric power is supplied to the heating device to lead to an increase in electric power consumption. Also, recording and reproducing elements making use of magnetoresistiveness to hold a mainstream at present are featured to be weak in resisting a thermal load and to be shortened in life when exposed to high temperature for a long period of time. Accordingly, when a heating device is arranged near to a recording and reproducing element and electric power applied to the heating device is large, there is a fear that the recording and reproducing element is reduced in life by heating.

On the other hand, with the magnetic disk apparatus in Patent Document 2, since a Peltier element is used to control a flying amount of a recording and reproducing element, there is caused a problem that it is practically difficult to incorporate the Peltier element into a magnetic head slider to exercise a necessary control.

It is a feature of the invention to provide a magnetic disk apparatus and a magnetic head slider to be able to achieve reduction in electric power consumption while ensuring a high recording density and a high reliability.

In specific embodiments, the invention has a feature in mounting a heating device so that heating by the heating device causes a part of an air bearing surface to expand and project to increase a distance between a recording and reproducing element and a surface of a magnetic disk.

A first aspect of the invention provides a magnetic disk apparatus having a rotatable magnetic disk and a magnetic head slider to be able to fly from a surface of the magnetic disk. The magnetic head slider includes an air bearing surface, by which the magnetic head slider is caused to fly and come near to the rotating surface of the magnetic disk with a predetermined spacing therebetween, a recording and reproducing element to perform at least one of recording on and reproduction from the magnetic disk, and a heating device to adjust a distance between the recording and reproducing element and the surface of the magnetic disk. The heating device is mounted such that heating thereof causes a part of the air bearing surface to expand and project to increase a distance between the recording and reproducing element and the surface of the magnetic disk.

Specific embodiments have one or more of the following features.

(1) The air bearing surface is formed by a plurality of substantially parallel surfaces, the plurality of surfaces include an element mount surface, which comes nearest to the magnetic disk at the time of operation and on which the recording and reproducing element is mounted, and a groove surface having two or more kinds of predetermined depths, respectively, from the element mount surface, and that position, in which the heating device is projected on the air bearing surface, is disposed within the element mount surface, and separated from that region, in which the recording and reproducing element is mounted, with a groove therebetween.

(2) The air bearing surface is formed by a plurality of substantially parallel surfaces, the plurality of surfaces include an element mount surface, which comes nearest to the magnetic disk at the time of operation and on which the recording and reproducing element is mounted, and a groove surface having two or more kinds of predetermined depths, respectively, from the element mount surface, and that position, in which the heating device is projected on the air bearing surface, is disposed within the groove surface.

(3) The air bearing surface includes four substantially parallel surfaces, the four surfaces include a first surface, which comes nearest to the magnetic disk at the time of operation and on which the recording and reproducing element is mounted, a second surface having a depth of about 3 nm to 50 nm from the first surface, a third surface having a predetermined depth from the second surface, and a fourth surface positioned further deep from the third surface, and that position, in which the heating device is projected on the air bearing surface, is disposed within the second surface, or within about 0.05 mm in the neighborhood thereof.

(4) That surface, on which the recording and reproducing element within the first surface is mounted, is not in contact with both the second surface and the third surface.

(5) That surface, on which the recording and reproducing element within the first surface is mounted, amounts in area to 0.005 mm2 or less.

A second aspect of the invention provides a magnetic disk apparatus having a rotatable magnetic disk and a magnetic head slider to be able to fly from a surface of the magnetic disk. The magnetic head slider includes an air bearing surface, by which the magnetic head slider is caused to fly and come near to the rotating surface of the magnetic disk with a predetermined spacing therebetween, a recording and reproducing element to perform at least one of recording on and reproduction from the magnetic disk, and a heating device to adjust a distance between the recording and reproducing element and the surface of the magnetic disk. The heating device includes a flying-amount increase heating device, of which heating causes a part of the air bearing surface to expand and project to increase a distance between the recording and reproducing element and the surface of the magnetic disk, and a flying-amount decrease heating device, of which heating causes another part of the air bearing surface to expand and project to decrease a distance between the recording and reproducing element and the surface of the magnetic disk.

Specific embodiments have one or more of the following features.

(1) The air bearing surface is formed by a plurality of substantially parallel surfaces, the plurality of surfaces include an element mount surface, which comes nearest to the magnetic disk at the time of operation and on which the recording and reproducing element is mounted, and a groove surface having two or more kinds of predetermined depths, respectively, from the element mount surface, and that position, in which the heating device is projected on the air bearing surface, is disposed within the element mount surface, and separated from that region, in which the recording and reproducing element is mounted, with a groove therebetween.

(2) The air bearing surface is formed by a plurality of substantially parallel surfaces, the plurality of surfaces include an element mount surface, which comes nearest to the magnetic disk at the time of operation and on which the recording and reproducing element is mounted, and a groove surface having two or more kinds of predetermined depths, respectively, from the element mount surface, and that position, in which the heating device is projected on the air bearing surface, is disposed within the groove surface.

(3) The air bearing surface includes four substantially parallel surfaces, the four surfaces include a first surface, which comes nearest to the magnetic disk at the time of operation and on which the recording and reproducing element is mounted, a second surface having a depth of about 3 nm to 50 nm from the first surface, a third surface having a predetermined depth from the second surface, and a fourth surface positioned further deep from the third surface, and that position, in which the heating device is projected on the air bearing surface, is disposed within the second surface, or within about 0.05 mm in the neighborhood thereof.

(4) That surface, on which the recording and reproducing element within the first surface is mounted, is not in contact with both the second surface and the third surface, and that surface, on which the recording and reproducing element within the first surface is mounted, amounts in area to 0.005 $mm^2$ or less.

(5) There is provided a control device that controls whether electric current is to be supplied to either of the flying-amount increase heating device and the flying-amount decrease heating device.

(6) The control device comprises a diode mounted in the magnetic head slider.

(7) The flying-amount increase heating device and the flying-amount decrease heating device are connected in parallel in the magnetic head slider through diodes, which are opposite to each other in polarity, and are connected to an electric connection terminal provided on an end surface of the magnetic head slider, and the control device controls whether electric current is to be supplied to either of the flying-amount increase heating device and the flying-amount decrease heating device, depending upon whether voltage applied to the electric connection terminal is positive or negative.

(8) The flying-amount increase heating device is larger in size than the flying-amount decrease heating device.

(9) A distance between the flying-amount increase heating device and the air bearing surface is larger than a distance between the flying-amount decrease heating device and the air bearing surface.

A third aspect of the invention provides a magnetic disk apparatus having a rotatable magnetic disk and a magnetic head slider to be able to fly from a surface of the magnetic disk. The magnetic head slider includes an air bearing surface, by which the magnetic head slider is caused to fly and come near to the rotating surface of the magnetic disk with a predetermined spacing therebetween, a recording and reproducing element to perform at least one of recording on and reproduction from the magnetic disk, and a heating device to adjust a distance between the recording and reproducing element and the surface of the magnetic disk. The heating device is mounted to change amounts, by which portions of the air bearing surface positioned on both sides of the magnetic head slider expand and project, to adjust a posture in a roll direction.

A fourth aspect of the invention provides a magnetic head slider including an air bearing surface, by which the magnetic head slider is caused to fly and come near to a rotating surface of a magnetic disk with a predetermined spacing therebetween, a recording and reproducing element to perform at least one of recording on and reproduction from the magnetic disk, and a heating device to adjust a distance between the recording and reproducing element and the surface of the magnetic disk. The heating device is mounted such that heating thereof causes a part of the air bearing surface to expand and project to increase a distance between the recording and reproducing element and the surface of the magnetic disk.

In some embodiments, the heating device includes a flying-amount increase heating device, of which heating causes a part of the air bearing surface to expand and project to increase a distance between the recording and reproducing element and the surface of the magnetic disk, and a flying-amount decrease heating device, of which heating causes another part of the air bearing surface to expand and project to decrease a distance between the recording and reproducing element and the surface of the magnetic disk.

According to the invention, it is possible to obtain a magnetic disk apparatus and a magnetic head slider to be able to achieve reduction in electric power consumption while ensuring a high recording density and a high reliability.

DETAILED DESCRIPTION OF THE INVENTION

Figure 1:
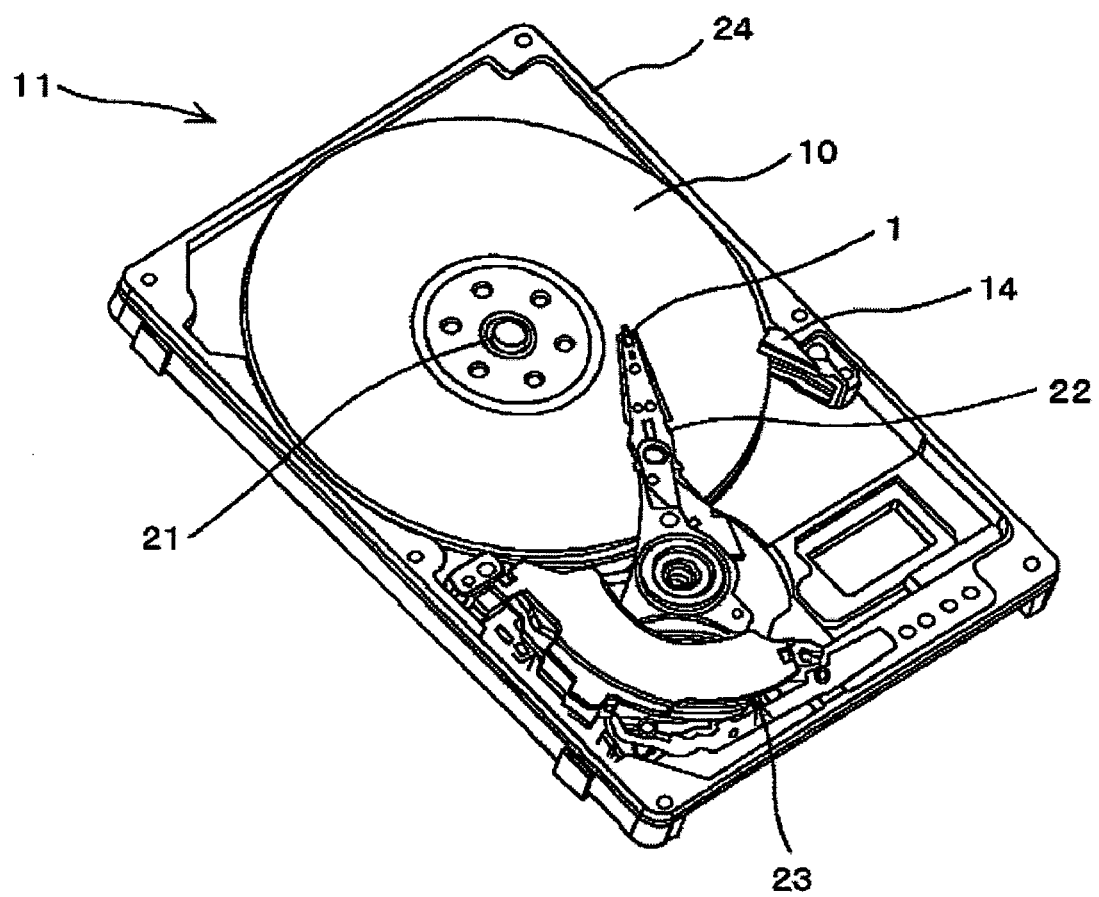
FIG. 1 is a perspective view showing a magnetic disk apparatus according to a first embodiment of the invention.

Plural embodiments of the invention will be described below with reference to the drawings. The same reference numerals in the drawings showing the respective embodiments denote the same or equivalent parts. In addition, the respective embodiments may be appropriately combined together to be made more effective.

First, a magnetic disk apparatus according to a first embodiment of the invention will be described with reference to FIGS. 1 to 7.

FIG. 1 shows a schematic construction of a magnetic disk apparatus 11 according to the embodiment. The magnetic disk apparatus 11 comprises a spindle motor 21, a rotatable magnetic disk 2, a magnetic head slider 1 to be able to fly from a surface of the magnetic disk, a turnable actuator 22 mounting the magnetic head slider 1 on one side thereof, and a voice coil motor 23 to drive the actuator 22. The magnetic disk apparatus 11 is provided with a base 24 and a cover (not shown) of a disk enclosure.

The magnetic head slider 1 mounts thereon a recording and reproducing element to record and reproduce magnetic information. A magnetic disk 10 stores magnetic information and is rotated by the spindle motor 21. The magnetic head slider 1 is mounted to a load beam in the form of a leaf spring, and given a push load on the magnetic disk surface by the load beam. Also, the voice coil motor 23 causes the magnetic head slider 1 together with the load beam to perform a seek motion radially of the magnetic disk 10 to perform record and reproduction on the whole magnetic disk surface. The magnetic head slider 1 is evacuated from the magnetic disk 10 onto a ramp 14 when the apparatus is stopped or a read and write command is absent for a specific period of time.

In addition, while the apparatus provided with a load/unload mechanism is shown here, the effect of the invention is likewise obtained even with a contact-start-stop type magnetic disk apparatus, in which a magnetic head slider 1 stands by in a specific region of a magnetic disk 10 while the apparatus stops.

The magnetic head slider 1 flies due to the wedge film effect of air as an air-lubricated bearing, so that the magnetic disk 10 and the magnetic head slider 1 are caused not to come into direct solid contact with each other. According to the embodiment, in order to make the magnetic disk apparatus 11 high in recording density and to thereby realize making the apparatus large in capacity, or small in size, it is taken into consideration to decrease a distance between the magnetic head slider and the magnetic disk, that is, a slider flying amount to increase the track recording density.

Figure 2:
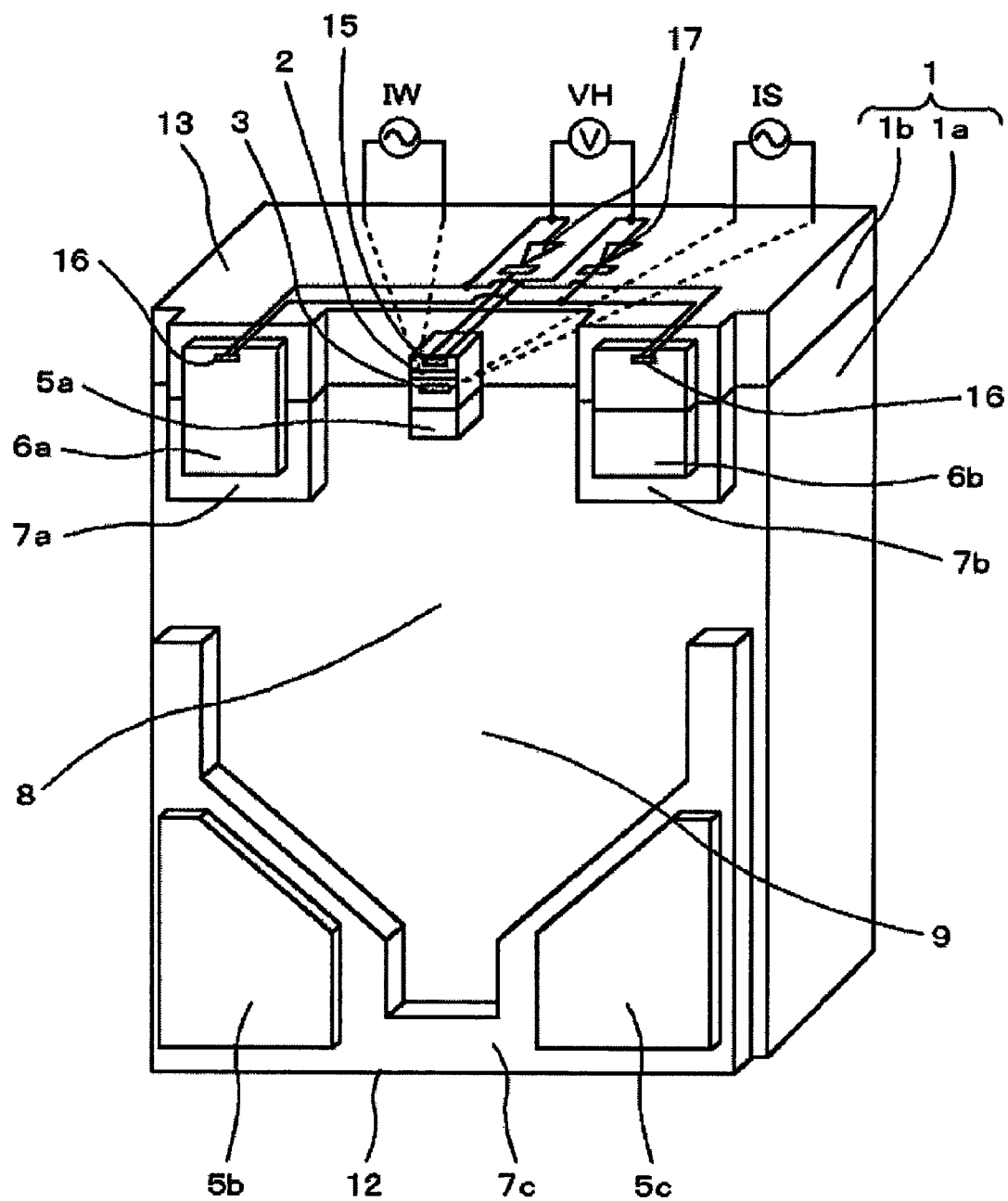
FIG. 2 is a perspective view showing a magnetic head slider used in the magnetic disk apparatus according to the first embodiment.

FIG. 2 is a perspective view showing the magnetic head slider 1 according to the embodiment. The magnetic head slider 1 comprises a substrate (wafer) portion 1a typified by a sintered body made of alumina and titanium carbide, and a thin-film head portion 1b, in which a recording and reproducing element and a wiring pattern are formed on a substrate by the thin-film processing and which is covered by a hard protective film such as alumina, etc.

The magnetic head slider 1 is in the form of a substantially rectangular prism having, for example, a length of 1.25 mm, a width of 1.0 mm, and a thickness of 0.3 mm, and composed of total six surfaces including an air bearing surface 9 being a flying surface, an air inflow end surface 12, an air outflow end surface 13, both side surfaces, and a back surface. The processing such as ion milling, etching, etc. is used to provide minute differences in level on the air bearing surface 9, the differences in level being opposed to the magnetic disk 10 (not shown) to generate an air pressure to serve as an air bearing that bears a load on the back surface. Further, in addition to dimensions in the embodiment, the magnetic head slider 1 is made smaller in size in conformity to a dimension standard to have a length of 0.85 mm, a width of 0.7 mm, and a thickness of 0.23 mm. A greater effect is produced when the construction according to the embodiment is applied to such small-sized magnetic head slider.

The air bearing surface 9 is provided with differences in level as described above and classified into four types of substantially parallel surfaces. The four types of surfaces are composed of four kinds of surfaces including an element mount surface (first surface) 5 closest to the magnetic disk, an ultra-shallow groove surface (second surface) 6 deeper about 5 nm than the element mount surface 5, a shallow groove surface (third surface) 7 deeper about 150 nm than the element mount surface 5 and constituting a step bearing surface, and a deep groove surface (fourth surface) 8 deeper about 1 μm than the element mount surface 5.

In addition, as shown in FIG. 2, the element mount surface 5, the ultra-shallow groove surface 6, and the shallow groove surface 7, respectively, are divided into plural components 5a to 5c, plural components 6a, 6b, and plural components 7a to 7c. Here, the component 5a defines the element mount surface, and the components 6a, 6b define the ultra-shallow groove surface. On the air outflow end side of the magnetic head slider 1, the element mount surface 5a is provided centrally thereof to project from the deep groove surface 8, the shallow groove surfaces 7a, 7b are provided on both right and left sides of the element mount surface 5a to project from the deep groove surface 8, and the ultra-shallow groove surfaces 6a, 6b are provided to project from a center of the shallow groove surfaces 7a, 7b. On the air inflow end side of the magnetic head slider 1, the shallow groove surface 7c is provided over a right and left front width of the magnetic head slider 1 to project from the deep groove surface 8, and the element mount surfaces 5b, 5c are provided to project from both right and left sides of the shallow groove surface 7c.

Figure 3:
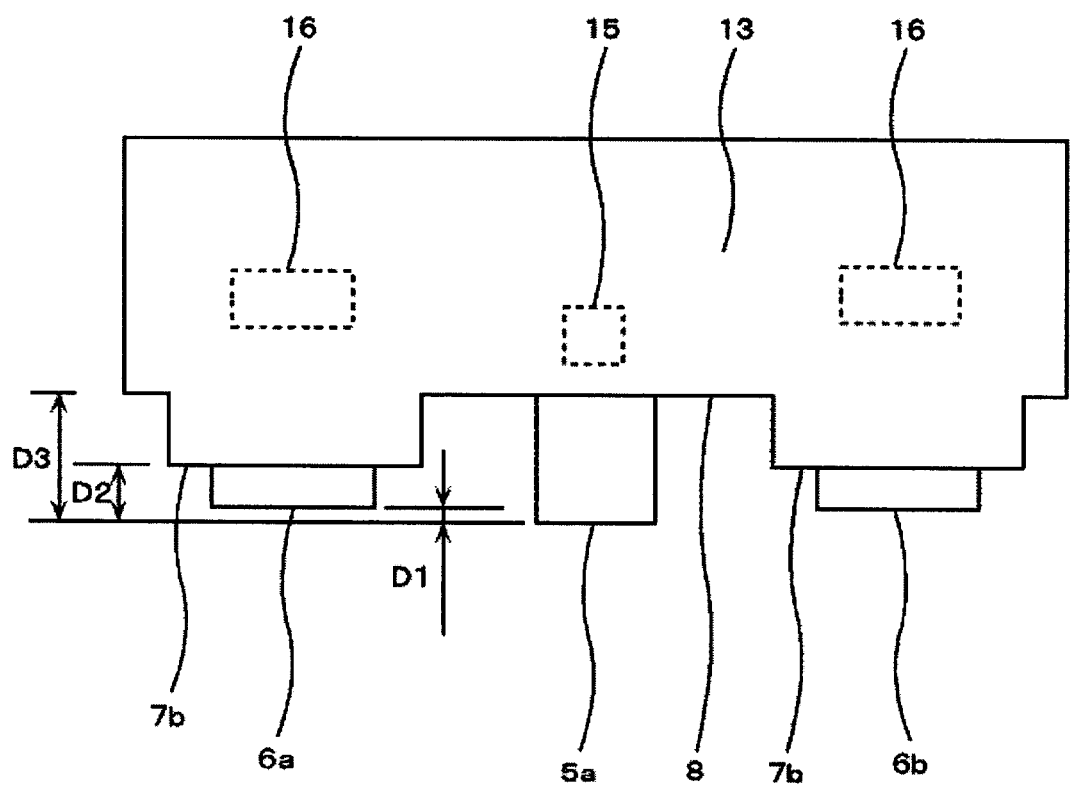
FIG. 3 is a view showing the magnetic head slider according to the first embodiment as viewed from an outflow end side.

FIG. 3 is a view as viewed from the air outflow end side of the magnetic head slider 1. FIG. 3 is a schematic view, in which the minute differences in level are depicted in an exaggerated manner. A dimension D1 from the element mount surface 5 to the ultra-shallow groove surface 6 amounts to about 5 nm, a dimension D2 from the element mount surface 5 to the shallow groove surface 7 amounts to about 150 nm, and a dimension D3 from the element mount surface 5 to the deep groove surface 8 amounts to about 1 □m. Differences in level of the respective surfaces disposed from the element mount surface 5 to the deep groove surface 8 are designed to be increased successively.

When an air flow generated upon rotation of the magnetic disk 10 enters the ultra-shallow groove surfaces 6a, 6b from the shallow groove surfaces 7a, 7b, which constitute a step bearing, and enters the element mount surfaces 5b, 5c from the shallow groove surface 7c, which constitute a step bearing, it is compressed in a convergent flow passage to generate a positive air pressure. In other words, an air pressure is generated in a direction, in which the magnetic head slider 1 separates from the magnetic disk 10. On the other hand, when an air flow enters the deep groove surface 8 from the shallow groove surface 7c, a negative air pressure is produced due to enlargement in a flow passage. In other words, an air pressure is generated in a direction, in which the magnetic head slider 1 comes near to the magnetic disk 10.

The magnetic head slider 1 is designed so as to become stable in that posture in a pitch direction, in which a flying amount on the air inflow end side is larger than that on the air outflow end side. Accordingly, a neighborhood of the air outflow end 13 of the air bearing surface 9 is made closest to the magnetic disk 10. Since the element mount surface 5a projects relative to the ultra-shallow groove surfaces 6a, 6b, the shallow groove surface 7a, and the deep groove surface 8 in the neighborhood of the outflow end, the element mount surface 5a is made closest to the magnetic disk 10 unless a pitch posture and a roll posture of the slider are inclined in excess of a specific limit. The recording and reproducing element composed of a recording element 2 and a reproducing element 3 is formed on the thin-film head portion 1b of the element mount surface 5a. The recording element 2 and the reproducing element 3 are constituted to make use of magnetoresistiveness, and featured to be weak in resisting a thermal load and to be shortened in life when exposed to high temperature for a long period of time. Also, at least the element mount surface 5a is coated with a protective film such as carbon, etc. in order to prevent corrosion of the recording and reproducing element.

A difference of about 5 nm in level between the element mount surface 5 and the ultra-shallow groove surface 6 is easily formed by removing the carbon film of about 5 nm with the use of techniques such as oxygen ashing, etc.

The thin-film processing such as sputtering, etc. is used to form a heating device composed of a thin film resistor in a region inside the magnetic head slider 1 inward from the element mount surface 5a, the heating device being referred to as a flying-amount decrease heater 15 in the embodiment. A heating element for the flying-amount decrease heater 15 is formed by meandering a thin wire, which is made of permalloy and has a thickness of about 0.5 μm, a width of about 3 μm, and a length of about 600 μm, in a region having a length of about 60 μm and a width of about 60 μm, and filling alumina in clearances. The value of resistance amounts to about 100 Ω. Since the flying-amount decrease heater 15 is formed in the thin-film head portion 1b, it can be readily formed. That position, in which the flying-amount decrease heater 15 is projected on the air bearing surface 9, is disposed in the neighborhood of the air outflow end 13 within the element mount surface 5a and separated from a region, in which the recording and reproducing elements 2, 3 are provided.

The thin-film processing such as sputtering, etc. is used to form heating devices composed of a thin film resistor in regions inside the magnetic head slider 1 inward from the ultra-shallow groove surfaces 6a, 6b in the same manner as the flying-amount decrease heater 15, the heating devices being referred to as flying-amount increase heaters 16 in the embodiment. Heating elements for the flying-amount increase heaters 16 are formed by meandering a thin wire, which is made of permalloy and has a thickness of about 0.5 μm, a width of about 3 μm, and a length of about 1200 μm, in a region having a length of about 60 μm and a width of about 120 μm, and filling alumina in clearances. Since the flying-amount increase heaters 16 are formed one by one on both sides of the magnetic head slider 1 and wiring is arranged in parallel, a total resistance amounts to about 100 Ω. In addition, the same effect as that described above is also produced when other metallic materials, such as nickel chrome alloy, etc., than permalloy are used for the flying-amount decrease heater 15 and the flying-amount increase heaters 16. Those positions, in which the flying-amount increase heaters 16 are projected on the air bearing surface 9, are disposed in the neighborhood of the air outflow end 13 within the ultra-shallow groove surfaces 6a, 6b.

Subsequently, operations of the flying-amount decrease heater 15 and the flying-amount increase heaters 16 will be described with reference to FIG. 4. FIG. 4(a) shows a state without heating, in which no electric current is supplied to the both heaters 15, 16. H0 indicates a spacing (flying amount) between the recording element 2 and the reproducing element 3, and the magnetic disk 10 in this state.

FIG. 4(b) shows a state, in which the flying-amount decrease heater 15 is heated by electric current. When electric current is supplied to the flying-amount decrease heater 15, the heater being a resistor generates heat to transmit the same in a manner indicated by arrows to warm surrounding materials. Since a major part of heat generated from the flying-amount decrease heater 15 is transmitted from the flying surface to the magnetic disk 10 to escape, only a neighborhood of the flying-amount decrease heater 15 is raised in temperature by the flying-amount decrease heater 15 and a temperature difference therebetween causes the element mount surface 5a to thermally expand and project. A spacing between the recording and reproducing elements 2, 3 and the magnetic disk 10 decreases to H1 (a smaller value than that of H0). As described later, since the air bearing surface 5a mounting thereon the recording and reproducing elements 2, 3 is designed to have a low loading capacity as an air bearing, a new air pressure is little generated even when the surface comes near to the magnetic disk, and a major part of an amount of projection is converted into a decrease in flying amounts of the recording and reproducing elements 2, 3 as it is.

FIG. 4(c) shows a state, in which the two flying-amount increase heaters 16 are heated by electric current. When electric current is supplied to the flying-amount increase heaters 16, the flying-amount increase heaters 16 being a resistor generate heat to transmit the same in a manner indicated by arrows to warm surrounding materials and thus cause thermal expansion of the ultra-shallow groove surfaces 6a, 6b. As described later, since the air bearing surfaces 6a, 6b with the flying-amount increase heaters being disposed in the neighborhood thereof are designed to have a high loading capacity as air bearings, a new air pressure is generated when the surfaces 6a, 6b come near to the magnetic disk, and the whole magnetic head slider rises to balance a slider load. That is, the construction is made to increase the recording and reproducing elements 2, 3 in flying amount.

As shown in FIG. 2, the air bearing surface 5a with the recording and reproducing elements 2, 3 and the flying-amount decrease heater 15 being in the neighborhood thereof includes no portion on a periphery thereof in contact with the shallow groove surface 7 and is surrounded by the deep groove surface 8. Therefore, the element mount surface does not act as a step bearing. Pressure change as generated is analyzed with an area of the element mount surface 5a as a parameter with the result that it is found that the area of the element mount surface 5a amounting to about 0.005 mm² or less is preferable.

On the other hand, the air bearing surfaces 6a, 6b with the flying-amount increase heaters 16 being in the neighborhood thereof contact with the shallow groove surfaces 7a, 7b on the inflow end 12 side. This produces the effect of a two-stage step bearing from the deep groove surface 8 to the shallow groove surface 7 and from the shallow groove surface 7 to the ultra-shallow groove surface 6, and thus the air bearing surfaces are high in loading capacity as air bearings. Also, the loading capacity is further enhanced by virtue of the air bearing surfaces 6a, 6b themselves being large in area.

In addition, for a dimension of a region, in which a thin wire of a thin film resistor meanders, the flying-amount increase heaters 16 are made larger in dimension of the region than the flying-amount decrease heater 15 as shown in FIG. 3. The reason for this is that the flying-amount increase heaters 16 having a large dimension of the region produce a gentle projecting shape and air pressure newly generated by the projection becomes large, which is advantageous in efficiently raising the whole slider. Another reason for this is that the flying-amount decrease heater 15 having a small dimension of the region produces a steep projecting shape and an air pressure newly generated by the projection is small, which makes it possible to decrease the flying-amount decrease heater 15 in size to enhance the efficiency of a decrease in flying.

As shown in FIG. 3, the flying-amount increase heaters 16 are positioned more distant from the air bearing surface 9 than the flying-amount decrease heater 15 is. This is because the flying-amount increase heaters 16 positioned distant from the flying surface produce a gentle projecting shape, which is advantageous in efficiently raising the whole slider. Another reason is that the flying-amount decrease heater 15 positioned near to the flying surface produces a steep projecting shape and an air pressure newly generated by the projection is small, which makes it possible to arrange the flying-amount decrease heater 15 near to the air bearing surface 9 to enhance the efficiency of a decrease in flying.

Here, an explanation will be given to the way of using the flying-amount adjustment heaters 15, 16 of the embodiment according to the purpose of use.

A first purpose is to compensate for fluctuation in flying amount, caused by a change in environmental, atmospheric pressure. In this case, since frequency of use in a low-pressure environment such as high mountain, airplane, etc. is markedly low as compared with the use at normal pressure, it is preferred that both the flying-amount adjustment heaters 15, 16 be not operated at normal pressure but the flying-amount increase heaters 16 be operated only at the time of low pressure.

A second purpose is to compensate for a difference in flying amount between that at the time of recording and that at the time of reproduction. Without adjustment in flying amount, thermal expansion and projection due to heating of the recording element 2 causes a difference in flying amount, so that when flying amount is designed in a manner to eliminate contact with the magnetic disk 10 also at the time of recording, separation from the magnetic disk 10 becomes excessive at the time of reproduction to deteriorate the reproduction performance. In order to compensate for such difference in flying amount, the flying-amount decrease heater 15 is operated at the time of reproduction, or the flying-amount increase heaters 16 are operated at the time of recording. The latter use is excellent in order to prevent a surplus thermal load from being applied on the recording element 2, which is weak in resisting heat.

A third purpose is to compensate for fluctuation in flying amount, caused by a change in environmental temperature. In this case, it is preferred that both the flying-amount adjustment heaters 15, 16 be not operated at normal temperature but the flying-amount increase heaters 16 be operated at high temperature, at which a decrease in flying amount is caused, and the flying-amount decrease heater 15 be operated at low temperature, at which an increase in flying amount is caused. However, when a magnetic disk apparatus 11 with plural magnetic head sliders 1 is designed so that contact to the very limit is avoided at normal temperature, there is a danger of contact among the plural magnetic head sliders 1 under high-temperature conditions, and so electric current must be always supplied to the plural magnetic head sliders 1 to increase a flying amount, which causes a problem of an increase in electric power consumption. Accordingly, it is preferred that the magnetic disk apparatus 11 with the plural magnetic head sliders 1 be designed so that contact is avoided even at somewhat higher temperature than normal temperature, and that the flying-amount decrease heater 15 be mainly operated and the flying-amount increase heaters 16 be operated only at the time of extremely high temperature.

A fourth purpose is to compensate for a fluctuation in flying amount, caused by a difference between inner and outer peripheries. In this case, since there is a fear of an increase in electric power consumption in the same manner as for the third purpose, in which a change in environmental temperature is compensated for, when the flying-amount increase heaters 16 are mainly used, it is preferred that design be made to somewhat increase a flying amount at the time of non-operation of heaters and the flying-amount decrease heater 15 be mainly used.

A fifth purpose is to compensate for descent at the time of high-speed seek. In this case, it is preferred that both the flying-amount adjustment heaters 15, 16 be not operated except at the time of seek and the flying-amount increase heaters 16 be operated only at the time of seek.

A sixth purpose is to compensate for a difference in flying amount, among individual sliders. In this case, since there is a fear of an increase in electric power consumption in the same manner as for the third purpose, in which a change in environmental temperature is compensated for, when the flying-amount increase heaters 16 are mainly used, it is preferred that design be made to somewhat increase an average flying amount with respect to dispersion and the flying-amount decrease heater 15 be mainly used. However, a magnetic disk apparatus with a single head does not apply to the case, and it is preferred that for a magnetic head slider 1 of an average flying amount, both the flying-amount adjustment heaters 15, 16 be not operated and for a magnetic head slider 1 of a flying amount out of the average, either of the flying-amount adjustment heaters 15, 16 be used to correct a flying-amount.

Figure 5:
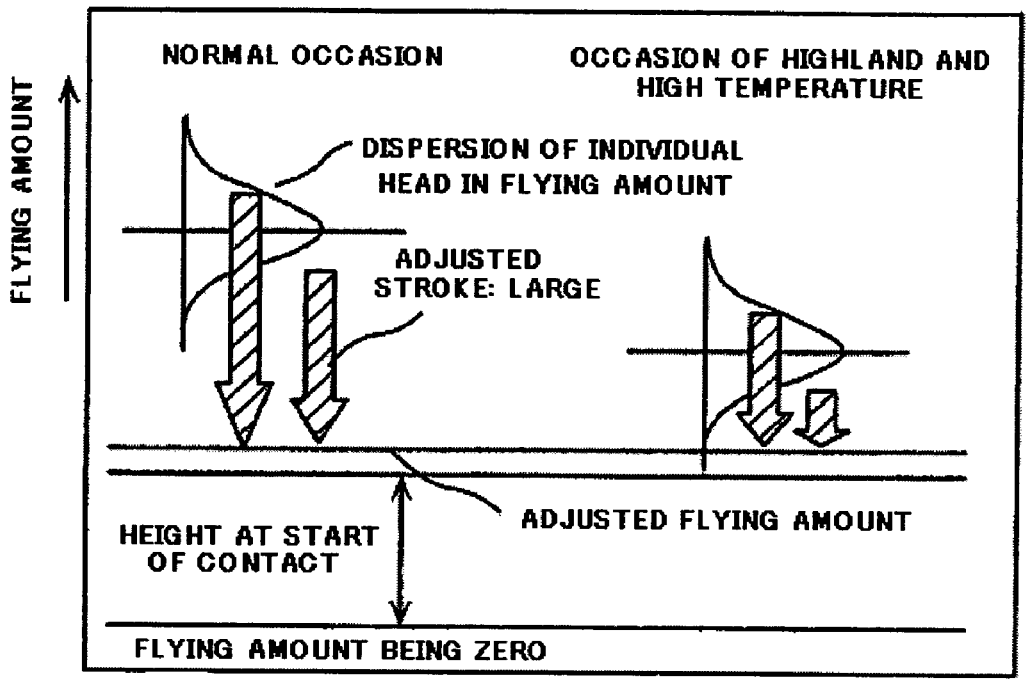
FIG. 5 is a conceptional view showing a difference between a conventional adjustment method and an adjustment method according to the first embodiment.
Figure 5:
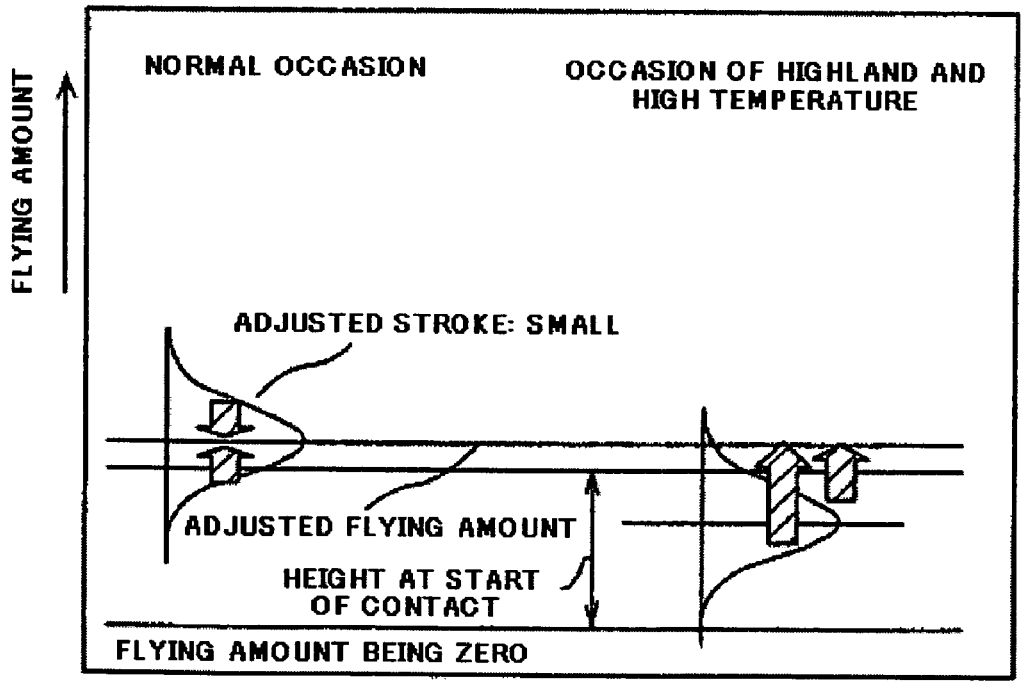

Referring to FIG. 5, an explanation will be given making a comparison between a conventional flying-amount adjustment method and a flying-amount adjustment method according to the present embodiment. The conventional flying-amount adjustment method is one, in which a flying-amount decrease heater is placed in the neighborhood of a recording and reproducing element to project only the neighborhood of the recording and reproducing element so that a flying amount is decreased by introduction of electric current. As shown in FIG. 5, an average required stroke and electric power consumption are large in the conventional one-direction flying-amount adjustment method since introduction of electric current is necessary even at a central value, at which frequency is large. On the other hand, a required stroke and electric power consumption can be decreased in the two-direction adjustment method according to the present embodiment since design can be made to eliminate introduction of electric current in a region near to a central value, at which frequency is large. The fear for a service life of a reproducing element, which is weak in resisting heat, is removed since electric power consumption is small and the flying-amount increase heaters 16 are sufficiently distant from the reproducing element 3.

Figure 6:
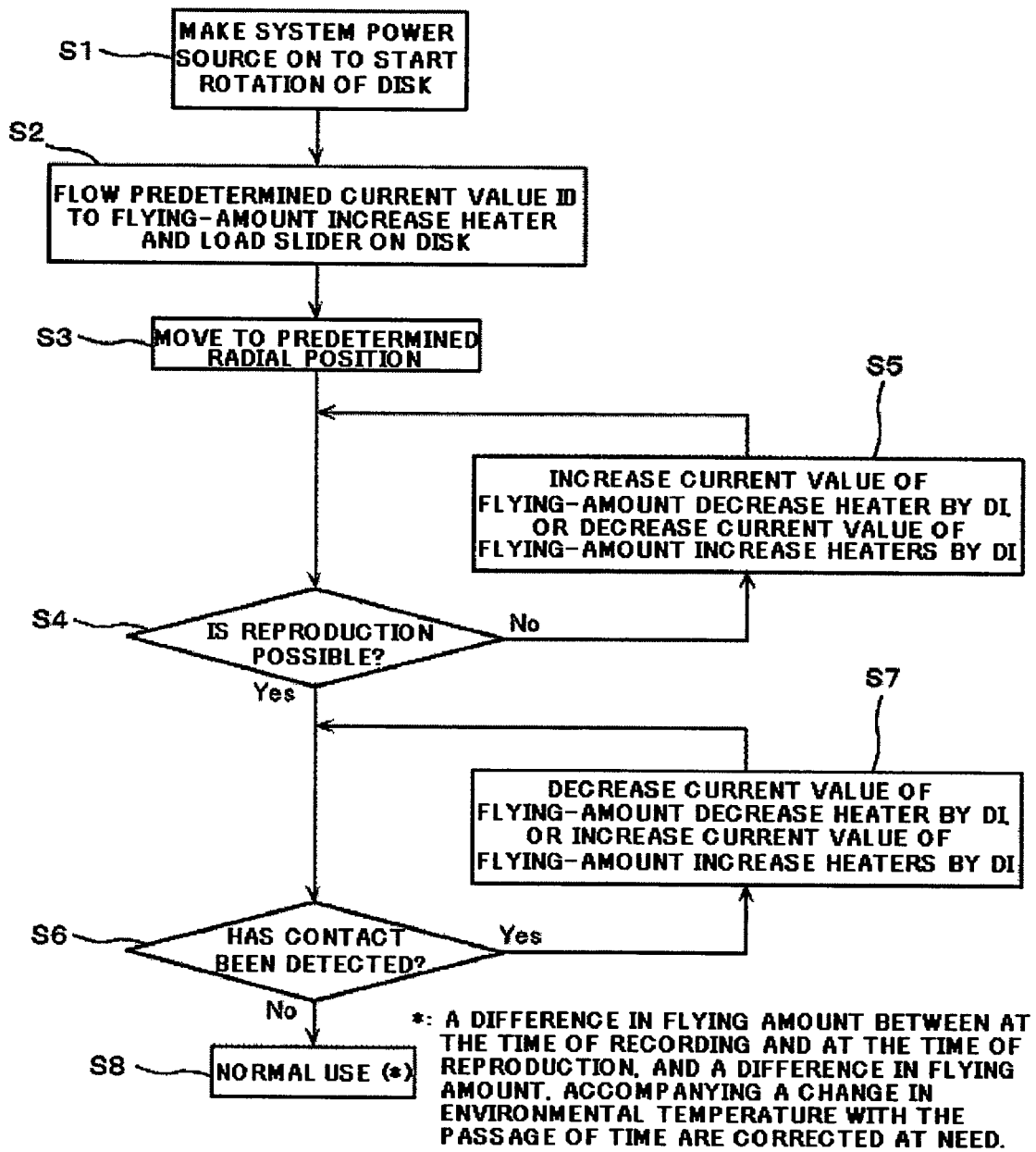
FIG. 6 is a flowchart illustrating a method of controlling the magnetic head slider according to the first embodiment.

Subsequently, a method of detecting a flying amount will be described. While there is also a method, in which sensors for measurement of atmospheric pressure and temperature are provided separately, a simplest control method comprises feedback control to monitor contact and error in reproduction to adjust electric power input into the flying-amount adjustment heaters 15, 16 only when such contact and error in reproduction occur, since there is caused no problem provided that two conditions that contact (excessive closeness) does not occur and no error occurs in reproduction of magnetic information (remoteness) are met in a state, in which all influences such as atmospheric pressure, temperature, and individual differences are involved. In addition, in order to prevent the elements from being damaged by impact upon loading, it is effective to supply electric current to the flying-amount increase heaters 16 to increase a flying amount when the magnetic head slider 1 is loaded on the magnetic disk 10, in particular, at the time of startup of the apparatus. p FIG. 6 shows the control algorithm exercised from the time of startup of the apparatus. First, a system power source is made ON to start rotation of the magnetic disk 10 (STEP S1). Subsequently, a predetermined current value I0 is caused to flow to the flying-amount increase heaters 16 and the magnetic head slider 1 is loaded on the magnetic disk 10 (STEP S2). Further, the magnetic head slider 1 is moved to a predetermined radial position (STEP S3). In this state, it is judged whether the magnetic head slider 1 enables reproduction (STEP S4). In the case where the magnetic head slider 1 cannot enable reproduction in this judgment, control is exercised in a manner to increase the current value of the flying-amount decrease heater 15 by ΔI, or to decrease the current value of the flying-amount increase heaters 16 by ΔI (STEP S5).

In the case where a state, in which the magnetic head slider 1 enables reproduction, comes out in STEP S4, it is judged whether contact of the magnetic head slider 1 has been detected (STEP S6). In the case where contact of the magnetic head slider 1 has been detected in this judgment, control is exercised in a manner to decrease the current value of the flying-amount decrease heater 15 by ΔI, or to increase the current value of the flying-amount increase heaters 16 by ΔI (STEP S7).

In the case where a state, in which contact of the magnetic head slider 1 is not detected, comes out in STEP S6, an operation in normal use is performed (STEP S8). With respect to fluctuation in flying amount, caused by temperature difference, it is necessary to monitor contact and error in reproduction every predetermined time interval, or always in use. Further, a difference in flying amount between at the time of recording and at the time of reproduction, and a difference in flying amount, accompanying a change in environmental temperature with the passage of time are corrected at need.

Methods of detection of contact include (1) a method using an acoustic emission (AE) sensor, (2) a method of monitoring thermal asperity indicative of noises appearing in a reproduction signal and caused by contact heating, and (3) a method of monitoring an off-track signal indicative of off-track generated when a magnetic head slider is caused by an interfacial frictional force to make minute rotation about a pivot, and the like.

On the other hand, with respect to an error in reproduction of magnetic information, it suffices to monitor a so-called bit error rate. Unlike an error in reproduction, it is difficult to monitor an error in recording, but the possibility of occurrence of an error in recording is also low under conditions that an error in reproduction does not occur, since a flying amount is generally smaller at the time of recording, at which elements expand due to coil heating of a recording element, than at the time of reproduction.

As a further method for flying amount adjustment, there is a method of making use of an amplitude of a reproduction signal to make in-situ observation of a distance between a reproducing element and a medium, thus enabling application of the method.

An advantage that those positions, in which the flying-amount increase heaters 16 are projected on the flying surface, are disposed not on the element mount surface 5*a* but on the ultra-shallow groove surfaces 6*a*, 6*b* resides in that it can be guaranteed that a portion of the flying surface closest to the recording and reproducing elements makes a lowest point (point closest to the magnetic disk) even when a somewhat roll posture is assumed in the case where the flying-amount increase heaters 16 are not caused to generate heat. In other words, a difference between a flying amount in a minimum flying-amount position and a flying amount in a position of the recording and reproducing element is small and hence loss in flying amount is small. On the other hand, in the case where the outflow end side edge of the element mount surface 5a is large in width, a distance between a minimum flying-amount position and a position of the recording and reproducing element is large and so loss in flying amount becomes large.

It is known that the access performance to the magnetic disk is improved when the outflow end side edge of the element mount surface 5a is made small in width to amount to the order of 30 μm to 60 μm, and so the construction according to the embodiment is advantageous in terms of an improvement in the access performance to the magnetic disk.

Figure 4:
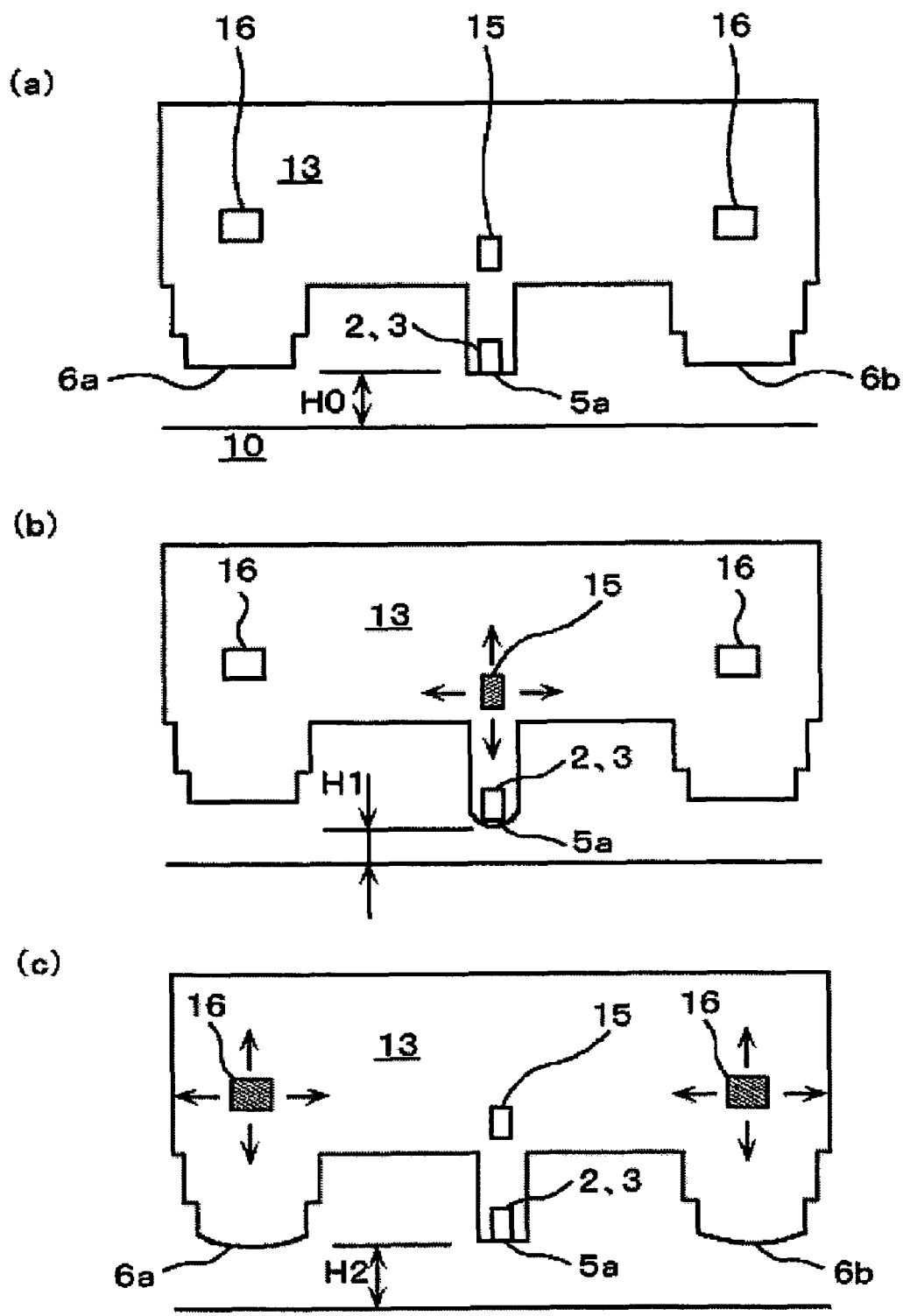
FIG. 4 is a view illustrating a flying-amount adjustment mechanism in the first embodiment.

In the case where portions defining the ultra-shallow groove surfaces 6a, 6b are made the same in height as the element mount surface 5a in FIGS. 2 to 4, loss in flying amount is large, as described above, as compared with the embodiment and the access performance to the magnetic disk is not improved but the effect of the invention can be produced likewise.

In order to control two types of heaters composed of the flying-amount decrease heater 15 and the flying-amount increase heaters 16, two systems-four wirings are usually needed but mounting is difficult when wirings are large in number. According to the present embodiment, paying attention to a special quality that two types of the heaters are not used at a time and a special quality that what is applied is d.c. voltage, two systems are arranged in parallel, and thin-film diodes 17 mounted on the magnetic head slider 1 are used to control whether either of the heaters is to be operated, depending upon whether applied voltage is positive or negative.

In a wiring from a control circuit of the magnetic disk apparatus to the magnetic head slider 1, two types of the heaters (the flying-amount decrease heater 15, the flying-amount increase heaters 16) are constructed to hold an electric-current supply wiring in common. The two types of the heaters 15, 16 are constructed to hold in common an electric connection terminal at the end surface of the magnetic head slider. Also, the two types of the heaters 15, 16 are connected in parallel in the magnetic head slider through the diodes 17, which are opposite to each other in polarity. Whether electric current is to be supplied to either of the two types of the heaters 15, 16 is controlled depending upon whether voltage applied to the electric connection terminal is positive or negative.

Figure 7:
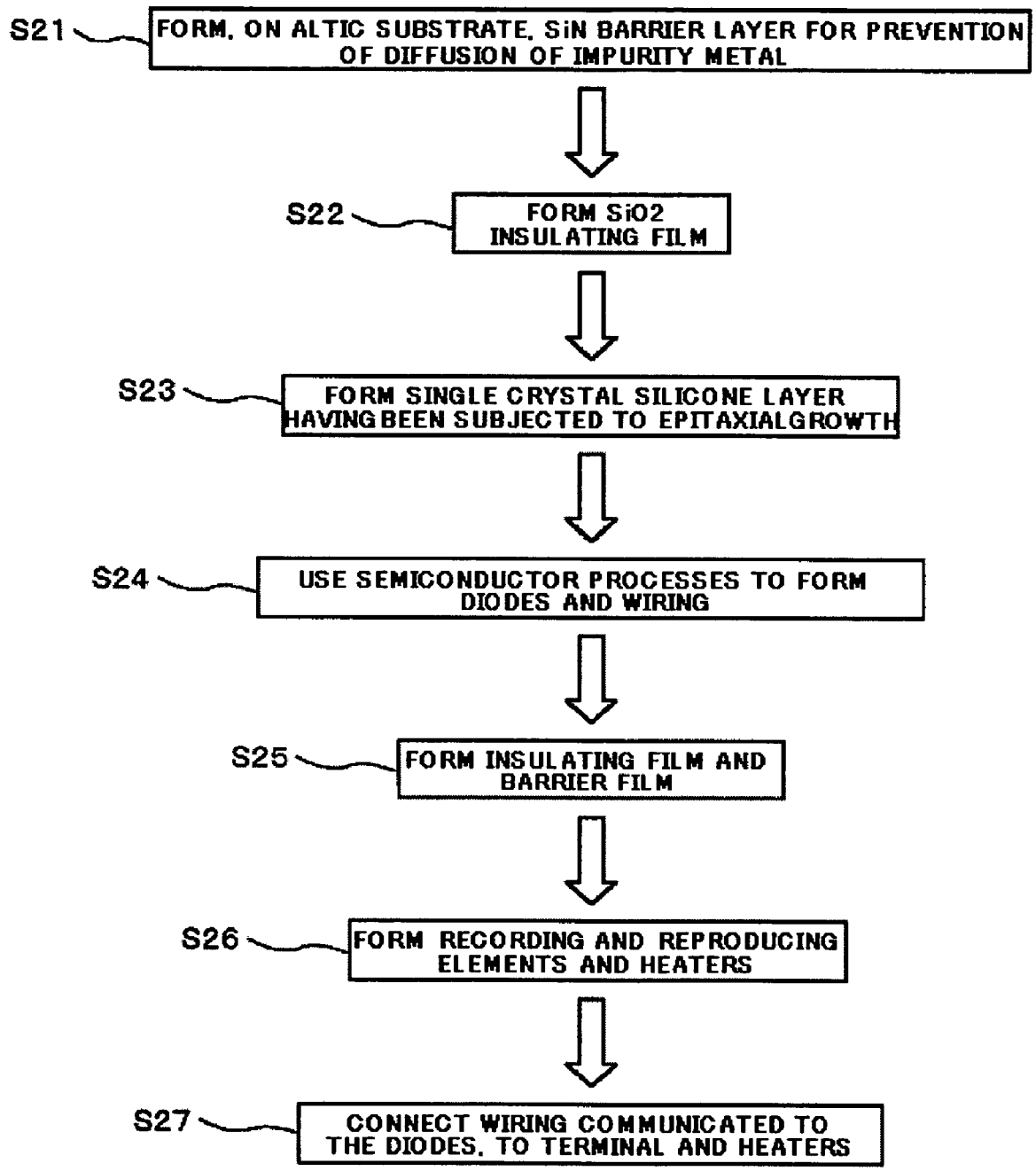
FIG. 7 is a flowchart illustrating a method of fabricating a thin-film diode according to the first embodiment.

FIG. 7 shows a method of fabricating the thin-film diodes. First, a SiN barrier layer for prevention of diffusion of impurity metal is formed on an altic substrate (STEP S21), a SiO2 insulating film is formed (STEP S22), a single crystal silicone layer having been subjected to epitaxial growth is formed (STEP S23), the semiconductor processes are used to form diodes and a wiring (STEP S24), an insulating film and a barrier film are formed (STEP S25), recording and reproducing elements and heaters are formed (STEP S26), and a wiring communicated to the diodes is connected to a terminal and the heaters (STEP S27).

The construction and functions of the present embodiment will be described together in the following manner.

According to the present embodiment, it is possible to realize adjustment of flying amount with a necessary electric power consumption being small. Adjustment of flying amount has a small influence on the service life of the reproducing element 3. Further, there is provided a practical method of wiring and mounting. As a result, the embodiment can decrease a margin in flying amount by adjusting a flying amount every individual head, or according to an environment in use, sharply reduces the recording and reproducing elements 2, 3 in flying amount while preventing contact between the magnetic head slider 1 and the magnetic disk 10, and contributes to an increase in recording density on the magnetic disk surface, and further to making the apparatus large in capacity, or small in size.

According to the present embodiment, conventional problems are solved not by one-way control only for a decrease in flying amount but by two-way control for a decrease and an increase in flying amount. In order to realize the two-way control, two types of the heaters 15, 16 for a decrease in flying amount and for an increase in flying amount are mounted in the magnetic head slider 1. The flying-amount decrease heater 15 is mounted in the neighborhood of the recording and reproducing elements 2, 3, and one or more flying-amount increase heaters 16 are mounted on the ultra-shallow groove surface components 6a, 6b sufficiently distant from the recording and reproducing elements 2, 3. The flying-amount increase heaters 16 cause thermal expansion and projection of the ultra-shallow groove surface components 6a, 6b, an air pressure generated on the ultra-shallow groove surface components 6a, 6b is increased, the magnetic head slider 1 is increased in load bearing capacity, and the whole magnetic head slider is lifted in a direction away from the magnetic disk 10. In this manner, according to the embodiment, the recording and reproducing elements are increased in flying amount by the heaters 15, 16.

The element mount surface component 5a with the recording and reproducing elements 2, 3 and the flying-amount decrease heater 15 being mounted in the neighborhood thereof is made small in area and surrounded by a deep groove, which is effective in reduction in electric power consumption. On the other hand, ultra-shallow groove surface components 6a, 6b with the flying-amount increase heaters 16 being mounted in the neighborhood thereof are made large in area and arranged with a shallow groove provided near thereto to constitute a step bearing, which is effective in reduction in electric power consumption.

The flying-amount increase heaters 16 are made larger in size than the flying-amount decrease heater 15. A distance between the flying-amount increase heaters 16 and the ultra-shallow groove surface components 6a, 6b is made larger than a distance between the flying-amount decrease heater 15 and the element mount surface component 5a. Such contrivance is effective in reduction in electric power consumption.

While two systems-four wirings are usually needed to control two types of the heaters 15, 16, mounting is difficult when wirings are large in number. According to the present embodiment, control can be surely exercised with a simple construction since two systems are arranged in parallel, and the thin-film diodes 17 mounted on the magnetic head slider 1 are used to control whether either of the heaters 15, 16 is to be operated, depending upon whether applied voltage is positive or negative.

Subsequently, second to fifth embodiments of the invention will be described with reference to FIGS. 8 to 11. The second to fifth embodiments are different from the first embodiment in the following manner but are fundamentally the same as the first embodiment in other points.

Figure 8:
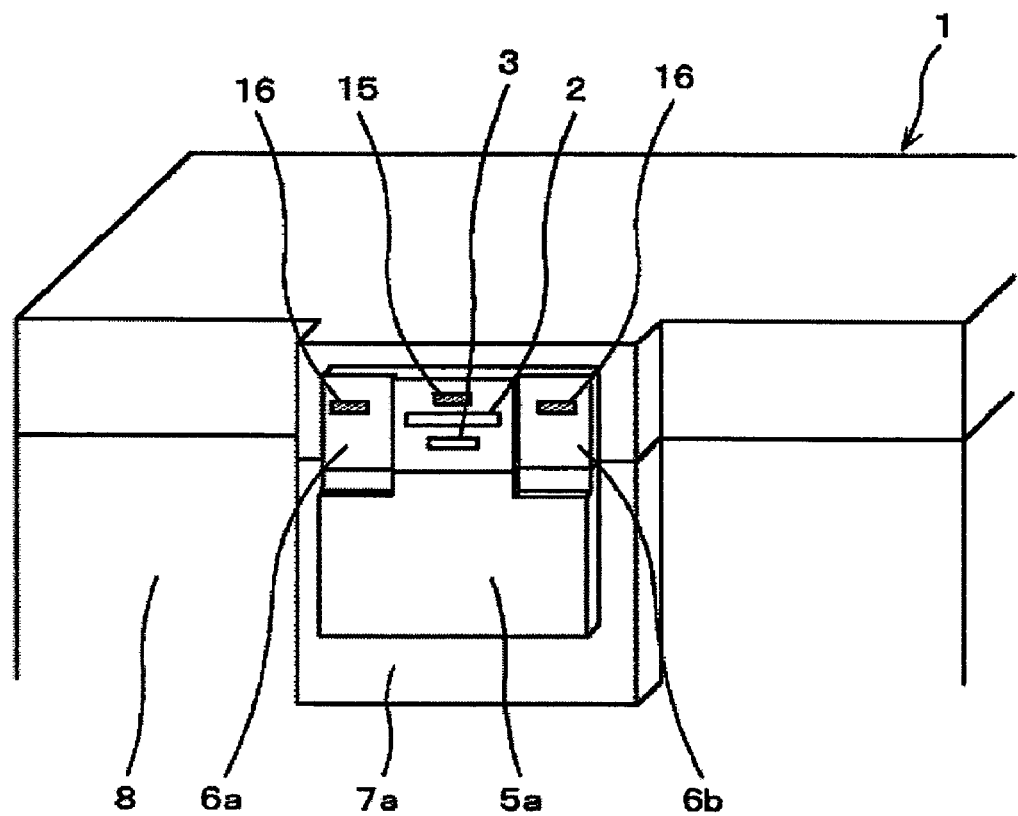
FIG. 8 is an enlarged view showing a neighborhood of an outflow end of a magnetic head slider used in a magnetic disk apparatus according to a second embodiment of the invention.

FIG. 8 is an enlarged, perspective view showing a neighborhood of an outflow end of a magnetic head slider used in a magnetic disk apparatus according to the second embodiment of the invention.

With the magnetic head slider 1 according to the second embodiment, a shallow groove surface 7a is provided centrally on an air outflow end side of a deep groove surface 8, and an element mount surface 5a and ultra-shallow groove surfaces 6a, 6b are provided above the shallow groove surface 7a. The element mount surface 5a has a planar shape such that an upper portion thereof in the figure is narrow (the same width as that in the first embodiment) and a lower portion thereof is wide. The ultra-shallow groove surfaces 6a, 6b are formed adjacent to both sides of a small-width portion of the element mount surface 5a. The same effect as that of the first embodiment is produced in that constitution of the second embodiment, which is common to that of the first embodiment.

In addition, in the case where portions defining the ultra-shallow groove surfaces 6a, 6b are made the same in height as the element mount surface 5a in FIG. 8, loss in flying amount is large as compared with the second embodiment and the access performance to a magnetic disk is not improved but an effect is produced, in which electric power consumption is small and temperature rise in a reproducing element is small.

Figure 9:
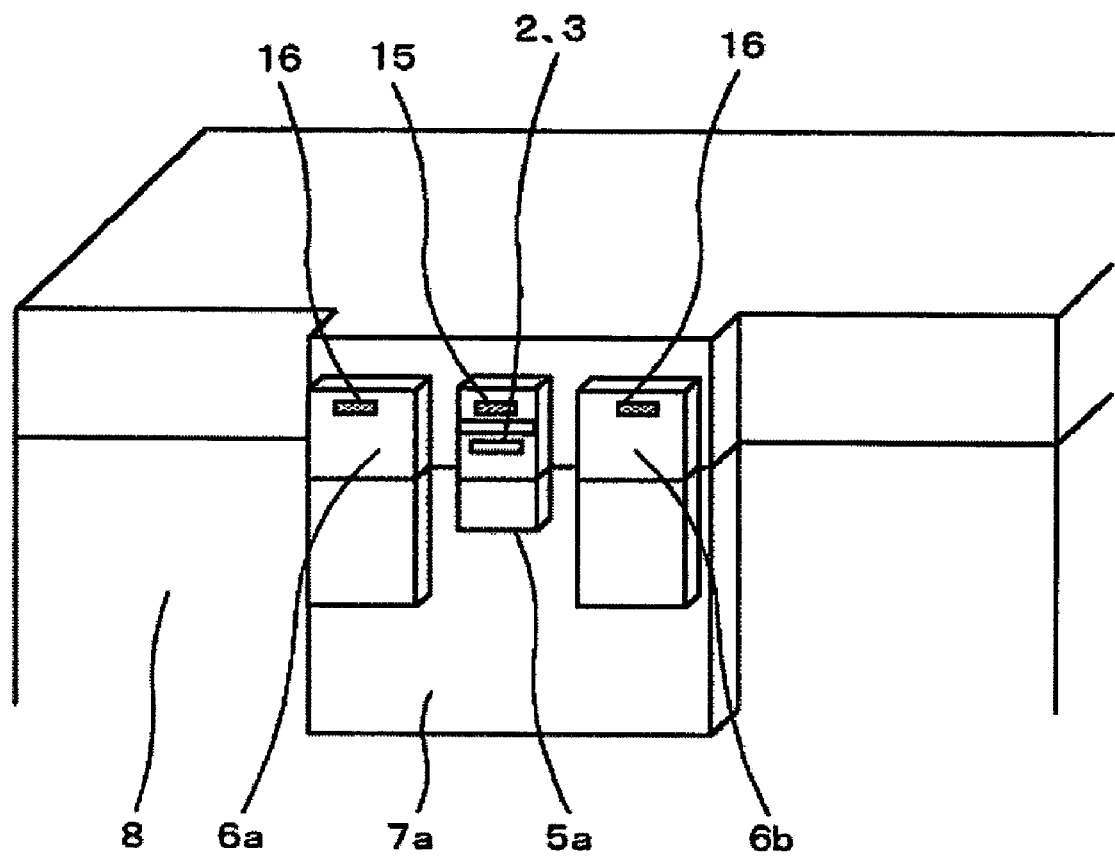
FIG. 9 is an enlarged view showing a neighborhood of an outflow end of a magnetic head slider used in a magnetic disk apparatus according to a third embodiment of the invention.

FIG. 9 is an enlarged, perspective view showing a neighborhood of an outflow end of a magnetic head slider used in a magnetic disk apparatus according to a third embodiment of the invention.

With the magnetic head slider 1 according to the third embodiment, a shallow groove surface 7a is provided centrally on an air outflow end side of a deep groove surface 8, and an element mount surface 5a and ultra-shallow groove surfaces 6a, 6b are provided above the shallow groove surface 7a. The element mount surface 5a is formed above the shallow groove surface 7a to have the same planar dimension as that in the first embodiment. The ultra-shallow groove surfaces 6a, 6b are formed on both sides of the element mount surface 5a with the shallow groove surface 7a therebetween. The same effect as that of the first embodiment is produced in that constitution of the third embodiment, which is common to that of the first embodiment.

In addition, in the case where portions defining the ultra-shallow groove surfaces 6a, 6b are made the same in height as the element mount surface 5a in FIG. 9, loss in flying amount is large as compared with the embodiment and the access performance to a magnetic disk is not improved but an effect is produced, in which electric power consumption is small and temperature rise in a reproducing element is small.

Figure 10:
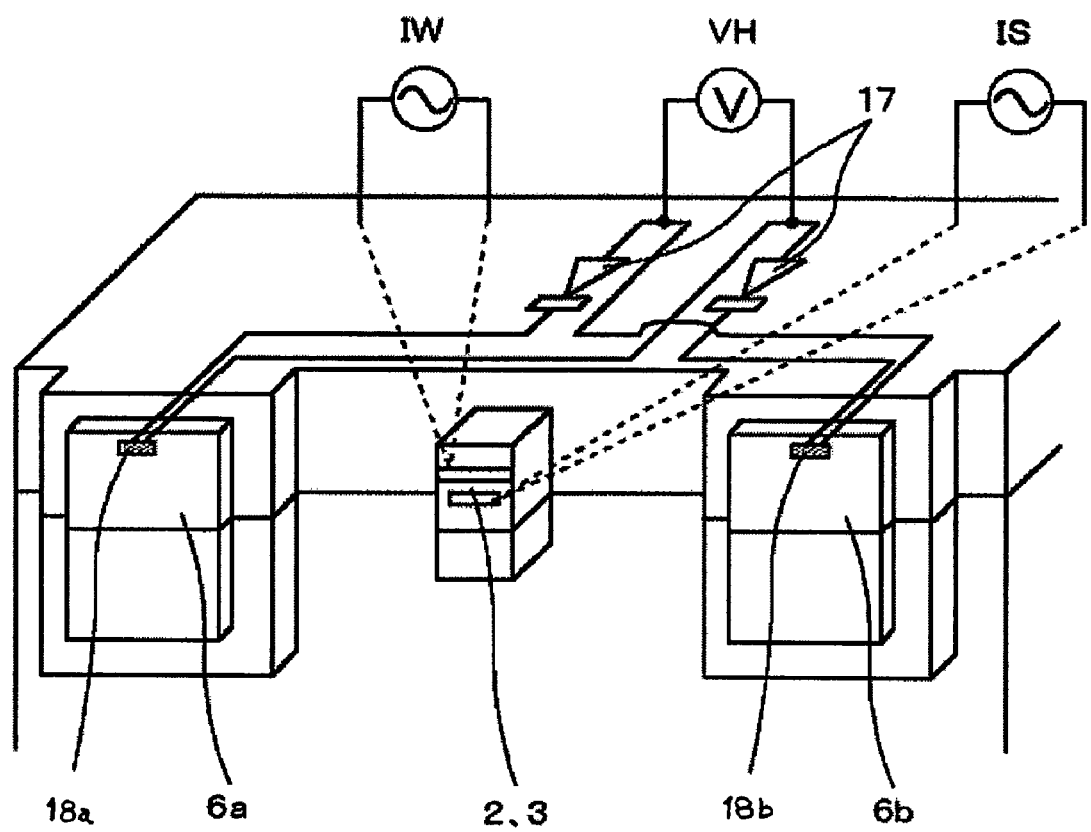
FIG. 10 is an enlarged view showing a neighborhood of an outflow end of a magnetic head slider used in a magnetic disk apparatus according to a fourth embodiment of the invention.

FIG. 10 is an enlarged, perspective view showing a neighborhood of an outflow end of a magnetic head slider used in a magnetic disk apparatus according to a fourth embodiment of the invention.

The fourth embodiment is intended not for adjustment of flying amount but for correction in roll posture. According to the fourth embodiment, any flying-amount decrease heater 15 is not provided and roll-posture correction heaters 18a, 18b are provided in place of the flying-amount increase heaters 16a, 16b. The roll-posture correction heaters 18a, 18b are controlled such that electric current is switched and supplied to either of the heaters depending upon whether applied voltage is positive or negative. In this manner, the construction is made such that when electric current is switched and supplied to either of the roll-posture correction heaters 18a, 18b depending upon whether applied voltage is positive or negative in this manner, the ultra-shallow groove surfaces (flying surfaces) 6a, 6b are caused to project, an air pressure is varied, and a roll posture is varied.

In addition, provided that any thin-film diodes 17 are not used and three-system wirings are used to control the heaters 18a, 18b independently, the fourth embodiment can possess the functions of not only correction in roll posture but also adjustment of flying amount in the case where electric current is simultaneously supplied to the both heaters.

Figure 11:
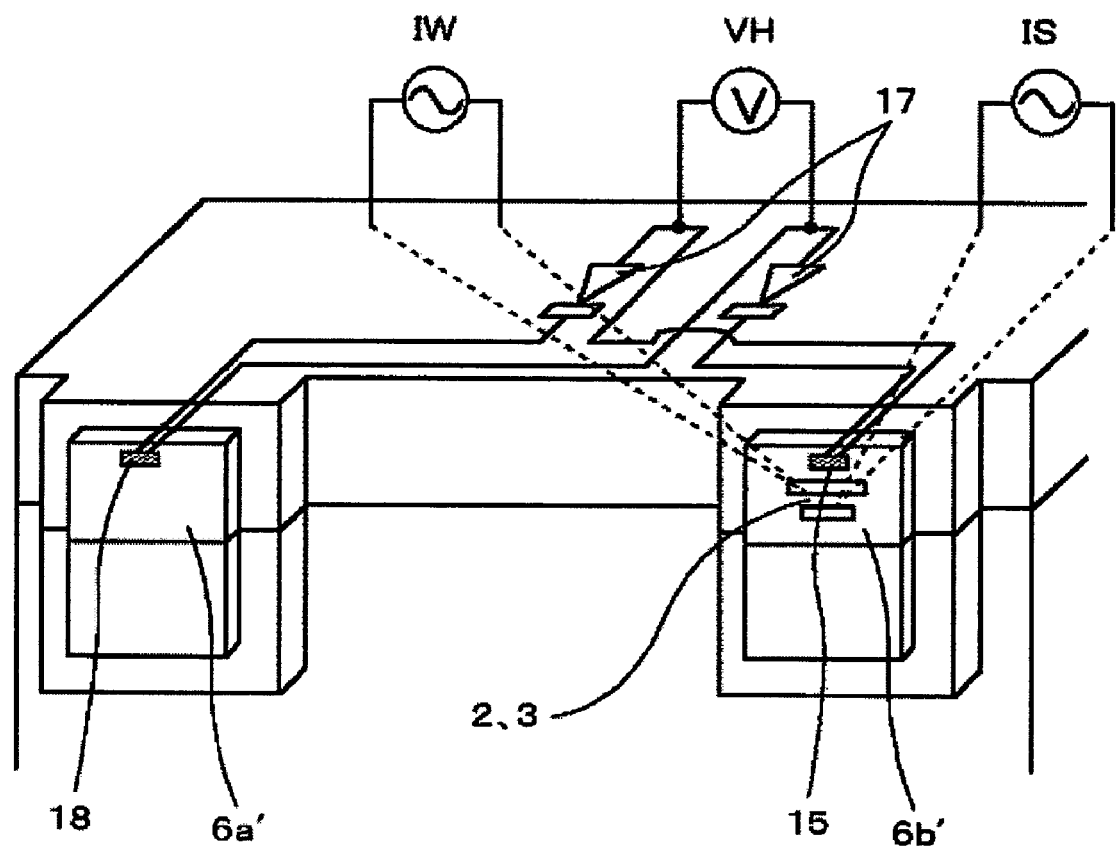
FIG. 11 is an enlarged view showing a neighborhood of an outflow end of a magnetic head slider used in a magnetic disk apparatus according to a fifth embodiment of the invention.

FIG. 11 is an enlarged, perspective view showing a neighborhood of an outflow end of a magnetic head slider used in a magnetic disk apparatus according to a fifth embodiment of the invention.

The fifth embodiment aims at both adjustment of flying amount and correction in roll posture. According to the fifth embodiment, any element mount surface 5a is not provided but ultra-shallow groove surfaces 6a, 6b constitute element mount surfaces 6a', 6b'. Any recording and reproducing elements 2, 3 are not provided on the element mount surface 6a' but a roll-posture correction heater 18 is provided thereon. Also, provided on the element mount surface 6b' are recording and reproducing elements 2, 3 and a flying-amount decrease heater 15.

With such construction, electric current is supplied to the roll-posture correction heater 18 to enable correction in roll posture, and electric current is supplied to the flying-amount decrease heater 15 to enable adjustment of flying amount of the recording and reproducing element.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk apparatus comprising a rotatable magnetic disk and a magnetic head slider to be able to fly from a surface of the magnetic disk, wherein:

the magnetic head slider includes an air bearing surface, by which the magnetic head slider is caused to fly and come near to the rotating surface of the magnetic disk with a predetermined spacing therebetween, a recording and reproducing element to perform at least one of recording on and reproduction from the magnetic disk, and a heating device to adjust a distance between the recording and reproducing element and the surface of the magnetic disk through an air pressure;

the air bearing surface is formed by a plurality of substantially parallel surfaces, the plurality of surfaces include an element mount surface, which comes nearest to the magnetic disk at the time of operation and on which the recording and reproducing element is mounted, and a groove surface having two or more kinds of predetermined depths, respectively, from the element mount surface, and that position, in which the heating device is projected on the air bearing surface, is disposed within the element mount surface, and separated from that region, in which the recording and reproducing element is mounted, with a groove therebetween; and the heating device is mounted such that heating thereof causes a part of the air bearing surface to expand and project to increase a distance between the recording and reproducing element and the surface of the magnetic disk.

2. A magnetic disk apparatus comprising a rotatable magnetic disk and a magnetic head slider to be able to fly from a surface of the magnetic disk, wherein:
   the magnetic head slider includes an air bearing surface, by which the magnetic head slider is caused to fly and come near to the rotating surface of the magnetic disk with a predetermined spacing therebetween, a recording and reproducing element to perform at least one of recording on and reproduction from the magnetic disk, and a heating device to adjust a distance between the recording and reproducing element and the surface of the magnetic disk through an air pressure;
   the air bearing surface is formed by a plurality of substantially parallel surfaces, the plurality of surfaces include an element mount surface, which comes nearest to the magnetic disk at the time of operation and on which the recording and reproducing element is mounted, and a groove surface having two or more kinds of predetermined depths, respectively, from the element mount surface, and that position, in which the heating device is projected on the air bearing surface, is disposed within the groove surface; and
   the heating device is mounted such that heating thereof causes a part of the air bearing surface to expand and project to increase a distance between the recording and reproducing element and the surface of the magnetic disk.

3. A magnetic disk apparatus comprising a rotatable magnetic disk and a magnetic head slider to be able to fly from a surface of the magnetic disk, wherein:
   the magnetic head slider includes an air bearing surface, by which the magnetic head slider is caused to fly and come near to the rotating surface of the magnetic disk with a predetermined spacing therebetween, a recording and reproducing element to perform at least one of recording on and reproduction from the magnetic disk, and a heating device to adjust a distance between the recording and reproducing element and the surface of the magnetic disk through an air pressure;
   the air bearing surface includes four substantially parallel surfaces, the four surfaces include a first surface, which comes nearest to the magnetic disk at the time of operation and on which the recording and reproducing element is mounted, a second surface having a depth of about 3 nm to 50 nm from the first surface, a third surface having a predetermined depth from the second surface, and a fourth surface positioned further deep from the third surface, and that position, in which the heating device is projected on the air bearing surface, is disposed within the second surface, or within about 0.05 mm in the neighborhood thereof; and
   the heating device is mounted such that heating thereof causes a part of the air bearing surface to expand and project to increase a distance between the recording and reproducing element and the surface of the magnetic disk.

4. The magnetic disk apparatus according to claim 3, wherein that surface, on which the recording and reproducing element within the first surface is mounted, is not in contact with both the second surface and the third surface.

5. The magnetic disk apparatus according to claim 4, wherein that surface, on which the recording and reproducing element within the first surface is mounted, amounts in area to about 0.005 mm2 or less.

6. A magnetic disk apparatus comprising a rotatable magnetic disk and a magnetic head slider to be able to fly from a surface of the magnetic disk, wherein:
   the magnetic head slider includes an air bearing surface, by which the magnetic head slider is caused to fly and come near to the rotating surface of the magnetic disk with a predetermined spacing therebetween, a recording and reproducing element to perform at least one of recording on and reproduction from the magnetic disk, and a heating device to adjust a distance between the recording and reproducing element and the surface of the magnetic disk;
   the air bearing surface is formed by a plurality of substantially parallel surfaces, the plurality of surfaces include an element mount surface, which comes nearest to the magnetic disk at the time of operation and on which the recording and reproducing element is mounted, and a groove surface having two or more kinds of predetermined depths, respectively, from the element mount surface, and that position, in which the heating device is projected on the air bearing surface, is disposed within the element mount surface, and separated from that region, in which the recording and reproducing element is mounted, with a groove therebetween; and
   the heating device includes a flying-amount increase heating device, of which heating causes a part of the air bearing surface to expand and project to increase a distance between the recording and reproducing element and the surface of the magnetic disk, and a flying-amount decrease heating device, of which heating causes another part of the air bearing surface to expand and project to decrease a distance between the recording and reproducing element and the surface of the magnetic disk.

7. A magnetic disk apparatus-comprising a rotatable magnetic disk and a magnetic head slider to be able to fly from a surface of the magnetic disk, wherein:
   the magnetic head slider includes an air bearing surface, by which the magnetic head slider is caused to fly and come near to the rotating surface of the magnetic disk with a predetermined spacing therebetween, a recording and reproducing element to perform at least one of recording on and reproduction from the magnetic disk, and a heating device to adjust a distance between the recording and reproducing element and the surface of the magnetic disk;
   the air bearing surface is formed by a plurality of substantially parallel surfaces, the plurality of surfaces include an element mount surface, which comes nearest to the magnetic disk at the time of operation and on which the recording and reproducing element is mounted, and a groove surface having two or more kinds of predetermined depths, respectively, from the element mount surface, and that position, in which the heating device is projected on the air bearing surface, is disposed within the groove surface; and
   the heating device includes a flying-amount increase heating device, of which heating causes a part of the air bearing surface to expand and project to increase a distance between the recording and reproducing element and the surface of the magnetic disk, and a flying-amount decrease heating device, of which heating causes another part of the air bearing surface to expand and project to decrease a distance between the recording and reproducing element and the surface of the magnetic disk.

8. A magnetic disk apparatus-comprising a rotatable magnetic disk and a magnetic head slider to be able to fly from a surface of the magnetic disk, wherein:

the magnetic head slider includes an air bearing surface, by which the magnetic head slider is caused to fly and come near to the rotating surface of the magnetic disk with a predetermined spacing therebetween, a recording and reproducing element to perform at least one of recording on and reproduction from the magnetic disk, and a heating device to adjust a distance between the recording and reproducing element and the surface of the magnetic disk;

the air bearing surface includes four substantially parallel surfaces, the four surfaces include a first surface, which comes nearest to the magnetic disk at the time of operation and on which the recording and reproducing element is mounted, a second surface having a depth of about 3 nm to 50 nm from the first surface, a third surface having a predetermined depth from the second surface, and a fourth surface positioned further deep from the third surface, and that position, in which the heating device is projected on the air bearing surface, is disposed within the second surface, or within about 0.05 mm in the neighborhood thereof; and the heating device includes a flying-amount increase heating device, of which heating causes a part of the air bearing surface to expand and project to increase a distance between the recording and reproducing element and the surface of the magnetic disk, and a flying-amount decrease heating device, of which heating causes another part of the air bearing surface to expand and project to decrease a distance between the recording and reproducing element and the surface of the magnetic disk.

9. The magnetic disk apparatus according to claim 8, wherein:

that surface, on which the recording and reproducing element within the first surface is mounted, is not in contact with both the second surface and the third surface, and that surface, on which the recording and reproducing element within the first surface is mounted, amounts in area to about 0.005 $mm^2$ or less.

10. A magnetic disk apparatus comprising a rotatable magnetic disk and a magnetic head slider to be able to fly from a surface of the magnetic disk, wherein:

the magnetic head slider includes an air bearing surface, by which the magnetic head slider is caused to fly and come near to the rotating surface of the magnetic disk with a predetermined spacing therebetween, a recording and reproducing element to perform at least one of recording on and reproduction from the magnetic disk, and a heating device to adjust a distance between the recording and reproducing element and the surface of the magnetic disk;

the heating device includes a flying-amount increase heating device, of which heating causes a part of the air bearing surface to expand and project to increase a distance between the recording and reproducing element and the surface of the magnetic disk, and a flying-amount decrease heating device, of which heating causes another part of the air bearing surface to expand and project to decrease a distance between the recording and reproducing element and the surface of the magnetic disk; and a control device that controls whether electric current is to be supplied to either of the flying-amount increase heating device and the flying-amount decrease heating device, wherein the control device comprises diodes mounted in the magnetic head slider.

11. A magnetic disk apparatus comprising a rotatable magnetic disk and a magnetic head slider to be able to fly from a surface of the magnetic disk, wherein:

the magnetic head slider includes an air bearing surface, by which the magnetic head slider is caused to fly and come near to the rotating surface of the magnetic disk with a predetermined spacing therebetween, a recording and reproducing element to perform at least one of recording on and reproduction from the magnetic disk, and a heating device to adjust a distance between the recording and reproducing element and the surface of the magnetic disk;

the heating device includes a flying-amount increase heating device, of which heating causes a part of the air bearing surface to expand and project to increase a distance between the recording and reproducing element and the surface of the magnetic disk, and a flying-amount decrease heating device, of which heating causes another part of the air bearing surface to expand and project to decrease a distance between the recording and reproducing element and the surface of the magnetic disk, the flying-amount increase heating device and the flying-amount decrease heating device are connected in parallel in the magnetic head slider through diodes, which are opposite to each other in polarity, and are connected to an electric connection terminal provided on an end surface of the magnetic head slider; and a control device that controls whether electric current is to be supplied to either of the flying-amount increase heating device and the flying-amount decrease heating device, depending upon whether voltage applied to the electric connection terminal is positive or negative.

* * * * *